United States Patent [19]
Thorson

[11] Patent Number: 6,055,618
[45] Date of Patent: Apr. 25, 2000

[54] VIRTUAL MAINTENANCE NETWORK IN MULTIPROCESSING SYSTEM HAVING A NON-FLOW CONTROLLED VIRTUAL MAINTENANCE CHANNEL

[75] Inventor: Gregory M. Thorson, Altoona, Wis.

[73] Assignee: Cray Research, Inc., Eagan, Minn.

[21] Appl. No.: 08/550,992

[22] Filed: Oct. 31, 1995

[51] Int. Cl.[7] .............................. G06F 15/16; H04L 12/00
[52] U.S. Cl. .............................. 712/11; 712/28; 709/240; 370/254; 370/406; 370/409
[58] Field of Search ..................... 395/200.12, 200.13, 395/200.1, 182.02, 200.69, 200.7, 200.71, 800.28, 800.29, 800.11; 370/252, 0.254, 403, 0.406, 397, 399, 409; 375/260; 712/11, 28, 29; 714/4; 709/239, 240, 241

[56] References Cited

U.S. PATENT DOCUMENTS

| | | | |
|---|---|---|---|
| Re. 28,577 | 10/1975 | Schmidt | 179/15 |
| 4,330,858 | 5/1982 | Choquet | 370/111 |
| 4,561,090 | 12/1985 | Turner | 370/231 |
| 4,630,259 | 12/1986 | Larson et al. | 370/216 |
| 4,771,391 | 9/1988 | Blasbalg | 364/514 |
| 4,868,818 | 9/1989 | Madan et al. | 371/11 |
| 4,933,933 | 6/1990 | Dally et al. | 370/406 |
| 5,008,882 | 4/1991 | Peterson et al. | 370/94.3 |
| 5,031,211 | 7/1991 | Nagai et al. | 379/221 |
| 5,036,459 | 7/1991 | Den Haan et al. | 364/200 |
| 5,081,623 | 1/1992 | Ainscow | 370/451 |
| 5,105,424 | 4/1992 | Flaig et al. | 370/94.1 |
| 5,157,692 | 10/1992 | Horie et al. | 375/260 |
| 5,161,156 | 11/1992 | Baum et al. | 371/7 |
| 5,170,482 | 12/1992 | Shu et al. | 395/800 |
| 5,175,733 | 12/1992 | Nugent | 370/94.3 |
| 5,218,601 | 6/1993 | Chujo et al. | 370/16 |
| 5,218,676 | 6/1993 | Ben-Ayed et al. | 395/200 |
| 5,239,545 | 8/1993 | Buchholz | 370/95.3 |
| 5,276,899 | 1/1994 | Neches | 395/800 |
| 5,280,474 | 1/1994 | Nickolls et al. | 370/60 |
| 5,297,137 | 3/1994 | Ofek et al. | 370/403 |
| 5,313,628 | 5/1994 | Mendelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,347,450 | 9/1994 | Nugent | 395/200 |
| 5,353,283 | 10/1994 | Tsuchiya | 370/60 |

(List continued on next page.)

FOREIGN PATENT DOCUMENTS

| | | |
|---|---|---|
| 0353819 | 2/1990 | European Pat. Off. . |
| 0475282 | 9/1990 | European Pat. Off. . |
| 0473452 | 3/1992 | European Pat. Off. . |
| 0501524 | 9/1992 | European Pat. Off. . |
| 0570729 | 4/1993 | European Pat. Off. . |
| 87/01750 | 3/1987 | WIPO . |
| WO88/08652 | 11/1988 | WIPO . |
| 95/16236 | 6/1995 | WIPO . |
| 96/32681 | 10/1996 | WIPO . |

OTHER PUBLICATIONS

Ning, D. Lin et al, "ATM Virtual Path Self–Healing Based on a New Path Restoration Protocol", Global Telecommunications Conference, Globecom '94, IEEE. vol. 2, pp. 794–798, Dec. 1994.

(List continued on next page.)

*Primary Examiner*—Eddie P. Chan
*Assistant Examiner*—Hong Kim
*Attorney, Agent, or Firm*—Schwegman, Lundberg, Woessner & Kluth, P.A.

[57] ABSTRACT

A multiprocessor computer system includes processing element nodes interconnected with physical communication links in an n-dimensional topology. A flow controlled virtual channel has virtual channel buffers assigned to each physical communication link to store packets containing information to be transferred between the processing element nodes. A non-flow controlled virtual maintenance channel has maintenance channel buffers assigned to each physical communication link to store packets of maintenance information to be transferred between the processing element nodes. The virtual maintenance channel is assigned a higher priority for accessing the physical communication links than the flow controlled virtual channel.

18 Claims, 5 Drawing Sheets

U.S. PATENT DOCUMENTS

| | | | |
|---|---|---|---|
| 5,365,228 | 11/1994 | Childs et al. | 340/825.8 |
| 5,434,846 | 7/1995 | Tremel et al. | 370/252 |
| 5,434,995 | 7/1995 | Oberlin et al. | 395/550 |
| 5,440,547 | 8/1995 | Easki et al. | 370/60 |
| 5,444,701 | 8/1995 | Cypher et al. | 370/406 |
| 5,453,978 | 9/1995 | Sethu et al. | 370/254 |
| 5,517,497 | 5/1996 | LeBoudec et al. | 370/60.1 |
| 5,533,198 | 7/1996 | Thorson | 395/200.69 |
| 5,539,449 | 7/1996 | Blahut et al. | 348/7 |
| 5,546,549 | 8/1996 | Barrett et al. | 395/309 |
| 5,548,639 | 8/1996 | Ogura et al. | 379/221 |
| 5,550,589 | 8/1996 | Shiojiri et al. | 348/387 |
| 5,555,542 | 9/1996 | Ogura et al. | 370/94.1 |
| 5,583,990 | 12/1996 | Birrittella et al. | 395/800.29 |
| 5,619,647 | 4/1997 | Jardine | 395/200.7 |
| 5,659,796 | 8/1997 | Thorson et al. | 395/200.71 |
| 5,684,961 | 11/1997 | Cidon et al. | 395/200.73 |
| 5,689,646 | 11/1997 | Thorson | 395/200.69 |
| 5,701,416 | 12/1997 | Thorson et al. | 395/800.11 |

OTHER PUBLICATIONS

Stephen C. Farkouh, "Managing ATM–Based Broadband Networks", IEEE Communications Magazine, vol. 31, ISS. 5, pp. 82–86, May 1993.

Jon Anderson et al., "ATM–Layer OAM Implementation, Issues", IEEE Communications Magazine, vol. 29, Iss 9, pp. 79–81, Sep. 1991.

Ni, L.M., et al., "A Survey of Wormhole Routing Techniques in Direct Networks", Computer, pp. 62–75, (1993).

Boura, Y.m., et al., "Efficient Fully Adaptive wormhole Routing in n–dimensional Meshes", IEEE, pp. 589–596, (Jun. 21, 1994).

"Deadlock–Free Routing Schemes on Multistage Interconnection Networks", IBM Technical Disclosure Bulletin, 35, 232–233 (Dec. 1992).

Robert Gallager, "Scale Factors for Distributed Routing Algorithms", NTC '77 Conference Record, 2 (1978).

Peter Nuth et al., "The J–Machine Network", IEEE, 420–423 (1992).

C.S. Yang et al., "Performance Evaluation of Multicast Wormhole Routing in 2D–Torus Multicomputers", IEEE, 173–178 (1992).

J. Yantchev et al., "Adaptive, low latency, deadlock–free packet routing for networks of processors", IEE Proceedings, 136, 178–186 (May 1989).

William Dally et al., "Deadlock–Free Message Routing in Multiprocessor Interconnection Networks", IEEE Transactions on Computers, C–36, 547–553 (May 1987).

William Dally, "Performance Analysis of k–ary n–cube Interconnection Networks", IEEE Transactions on Computers, 39, 775–785 (Jun. 1990).

William Dally, "Virtual–Channel Flow Control", IEEE, 60–68 (1990).

C.R. Jesshope, P.R. Miller and J.P. Yantchev, High Performance Communications in Processor Networks, proc. 16th International Symposium on Computer Architecture at 150–157, May 1989.

D.H. Linder and J.C. Harden, An Adaptive and Fault Tolerant Wormhole Routing Strategy for k–ary n–cubes, I.E.E.E. Trans. on Computers, at 2–12, Jan. 1991.

W.J. Dally and H. Aoki, Deadlock–Free Adaptive Routing in Multicomputer Networks Using Virtual Channels, I.E.E.E. Transactions on Parallel and Distributed Systems, vol. 4, No. 4, at 466–475, Apr. 1993.

C.J. Glass and L.M. Ni, The Turn Model for Adaptive Routing, Proc. 19th International Symposium on Computer architecture, at 278–287, May 1992.

A.A. Chien and J.H. Kim, Planar–Adaptive Routing: Low––Cost Adaptive Networks for Multiprocessors, proc. 19th International. Symposium on Computer Architecture at 268–277, May 1992.

J. Duato, A New Theory of Deadlock–Free Adaptive Routing in Wormhole Networks, I.E.E.E. Transactions on Parallel and Distributed Systems, vol. 4, No. 12, at 1320–1331, Dec. 1993.

Adve, V.S. and M.K. Vernon, "Performance Analysis of Mesh Interconnection Networks with Deterministic Routing," Transactions on Parallel and Distributed Systems, pp. 225–246, Mar. 1994.

Kevin Bolding, Non–Uniformities Introduced by Virtual Channel Deadlock Prevention, Technical Report 92–07–07, Department of Computer Science and Engineering, FR–35 University of Washington, Seattle, WA 98195, USA, Jul. 21, 1992.

S. Kirkpatrick, et al., Optimization by Simulated Annealing, Science, May 13, 1993, vol. 220, No. 4598, pp. 671–680.

Weilin Wang, et al., Trunk Congestion Control in Heterogeneous Circuit Switched Networks, IEEE TRansactions on Communications, vol. 40, No. 7, Jul. 1992, pp. 1156–1161.

Lawrence Synder, Introduction to the Configurable, Highly Parallel Computer, Jan. 1982, pp. 47–56.

D. Talia; "Message–Routing Systems for Transputer–Based Multicomputers"; IEEE Micro; No. 3, pp. 62–72; (Jun. 13, 1993).

"International Search Report for International Application No. PCT/US95/15483", Date of completion—Apr. 24, 1996; Authorized Officer—P. Schenkels.

Bolla, R., et al. "A Neural Strategy for Optimal Multiplexing of Circuit and Packet–Switched Traffic", Department of Communications, Computer and Systems Science (Dist), University of Genova, 1324–1330.

Bundy, A., et al., "Turning Eureka Stepsinto Calculations in Automatic Program", UK IT, (IEE Conf. Pub. 316), pp. 221–226, (1991).

Carlile, B.R., "Algorithms and Design: The CRAP APP Shared–Memory System", Comcon Spring '93, pp. 312–320, Feb. 22, 1993, San Francisco, CA.

Gravano, L., et al., "Adaptive Deadlock– and Livelock—Free Routing with all Minimal Paths in Torus Networks", IEEE Transactions on Parallel and Distributed Systems, vol. 5, No. 12, 1233–1251, (Dec. 1994).

Gupta, R., et al., "High speed Synchronization of Processors Using Fuzzy Barriers", International Journakl of Parallel Programming 19 (1990) Feb., No. 1, New York, US pp. 53–73.

Ishihata, H., et al., "Architecture of Highly Parallel AP1000 Computer", Scripta Technica, Inc., Systems and Computers in Japan 24, No. 7,, pp. 69–76, (1993).

Lui, Z., et al., "Grouping Virtual Channels for Deadlock–Free Adaptive Wormhole Routing", Parle '93 Parallel Parallel Architectures and Languages Europe, 5th International Parle Conference, Munich, Germany\, 255–265, (Jun. 14–17, 1993).

O'Keefe, M.T., et al., "Static Barrier MIMD: Architecture and Performance Analysis", Journal of Parallel and Distributed Computing No. 2,, pp. 126–132, (Mar. 25, 1995).

Shumay, M., "Deadlock–Free Packet Networks", Transputer Research and Applications 2, NATUG–2 Proceedings of the Second Conference of the North American Transputer Users Group, 140–177, (Oct. 18–19, 1989).

Wu, M., et al., "Do and Forall: Temporal and Spacial Control Structures", Procedings, Third Workshop on Compilers for Parallel Computers, ACPC/TR, Jul. 1992.

VIRTUAL MAINTENANCE NETWORK IN MULTIPROCESSING SYSTEM HAVING A NON-FLOW CONTROLLED VIRTUAL MAINTENANCE CHANNEL

FIELD OF THE INVENTION

The present invention relates generally to the field of high-speed digital data processing systems, and more particularly, to a multiprocessor computer system having a virtual maintenance channel which shares the same physical communication links with other virtual routing channels.

BACKGROUND OF THE INVENTION

Multiprocessor computer systems comprise a number of processing element nodes connected together by an interconnect network. The interconnect network transmits packets of information between nodes. Packets comprise multiple physical transfer units (phits). A phit is typically the width of a network physical communication link or physical channel between processing element nodes. The interconnect network typically carries normal traffic and maintenance traffic. Examples of information possibly contained in a normal traffic packet are messages, a shared-memory operation, or various forms of data. The maintenance traffic, on the other hand, is used for such tasks as system initialization, system configuration, diagnostics, hardware monitoring, error monitoring, performance monitoring, and other such maintenance tasks.

In previous multiprocessor computer systems, the maintenance traffic travels on its own physical maintenance network, which includes physical communication links not used by the normal communication traffic. In fact, the physical communication links used by the normal traffic are completely separate from the physical maintenance network. In other words, the conventional interconnect network includes one set of wires to carry maintenance traffic and a different set of wires to carry normal traffic.

The normal traffic portion of the interconnect network is typically flow controlled such as with store-and-forward mechanisms where packets are transferred in single units from node to node along the path from source to destination. Each node waits to pass the head of a packet onto the next node until the last phit of the packet has been received. More recent multiprocessor systems utilize normal traffic interconnect networks using some form of wormhole routing to control the flow of normal traffic packets. Wormhole routing interconnect networks route the head of the packet from a node before the tail of the packet is received by that node. The packet is divided into a number of smaller message packets called flow control units (flits), which may be one or more phits. A header flit contains routing information. The header flit is received by a processing element node and examined as to its destination. The header flit is sent on to the next node indicated by the routing algorithm. The remaining flits follow behind the header flit in a train-like fashion. Flow control between nodes is accomplished on a flit-by-flit basis, rather than a packet-by-packet basis as in the store-and-forward interconnect networks. Thus, in wormhole routing, a packet may be partially transmitted across a physical communication link, and then blocked due to a shortage of buffer space in the receiving node.

Worm hole routing significantly reduces packet latency in lightly loaded networks, because the time to transmit the packet onto a link (phits per packet times clock period) is suffered only once per network transversal, rather than once per hop. Wormhole routing also significantly reduces network buffering requirements, as a node is not required to buffer an entire packet.

A problem with wormhole routing, however, is that when a header flit blocks, the remaining flits stall behind the header. These remaining flits may possibly be across multiple links and nodes in the network. A blocked packet may prevent other packets from proceeding, even those that do not want to route through the node at which the header flit is blocked. This can cause significant network degradation, especially in the presence of non-uniform communication patterns.

A third type of normal traffic interconnect network is a virtual cut-through network. A virtual cut-through interconnect network is similar to wormhole routing networks, except that when a packet blocks a buffer, that buffer must always accept the entire packet. Thus, virtual cut-through routing avoids some problems inherent in the blocking occurring in wormhole routing, but at the cost of additional hardware necessary to buffer all of the blocked packets.

Deadlock occurs when cyclic dependencies arise among a set of channel buffers, causing all involved buffers to fill up and block. A primary consideration in the design of interconnect networks and corresponding routing algorithms is avoiding deadlock. Deadlock situations can be formalized via a channel dependency graph, a directed graph whose nodes represent network channels and whose arcs represent dependencies between channels. An arc exists between channels x and y if a packet can route directly from channel x to channel y. It can be proven that a network is deadlock free if its channel dependency graph is acyclic. However, even if a healthy network can be proven to be deadlock free, deadlock could still occur due to a fault in the network.

One simple method to avoid deadlock is to restrict the topology of the interconnect network and/or the routing function used to route packets between the processing element nodes on the interconnect network to remove the possibility of cyclic buffer dependencies. For example, a binary hypercube topology is deadlock-free if the routing function is restricted so that the dimensions are always traversed in increasing order using the e-cube or dimension order routing algorithm. Since at most one hop is made per dimension and no packets route to a lower dimension, there can be no cyclic buffer dependencies. The e-cube routing algorithm can also be used to make an n-dimensional mesh topology deadlock-free, since the opposite-flowing traffic in each dimension uses distinct sets of buffers and the dimensions are traversed in increasing order. The torus topology, however, is not deadlock free when restricted to e-cube routing, because the wrap-around links in the torus topology allow cyclic buffer dependencies to form on a single ring.

In addition, even in meshes, deadlock can arise due to dependencies between request and response packets. Since a node may not be able to accept more request packets until that node has transmitted response packets for previous requests, deadlock can occur if response packets are made to wait behind request packets in the network. An expensive solution to this dependency problem between request and response packets is to use separate physical networks for requests and responses.

Virtual channels have been used to avoid deadlock and to reduce network congestion for normal traffic. Each physical channel is broken up into one or more virtual channels. Each virtual channel includes virtual channel buffers to store packets along a virtual path. The virtual channels are multiplexed across common physical channels, but otherwise operate independently. Thus, a blocked packet on a first virtual channel multiplexed across the common physical channel does not block packets behind a second virtual channel multiplexed on the common physical channel.

SUMMARY OF THE INVENTION

The present invention provides a multiprocessor computer system including processing element nodes and physical communication links interconnecting the processing element nodes in an n-dimensional topology. At least one flow controlled virtual channel includes virtual channel buffers assigned to each physical communication link to store packets containing normal traffic information to be transferred between the processing element nodes. A non-flow controlled virtual maintenance channel includes maintenance channel buffers assigned to each physical communication link to store packets of maintenance information to be transferred between the plurality of processing element nodes. The maintenance channel is assigned a higher priority for accessing the physical communication links than the at least one flow controlled virtual channel.

The non-flow controlled virtual maintenance channel is preferably accessible through system software running on the multiprocessor computer system from any of the processing element nodes. Nevertheless, in one embodiment of the present invention, the system software is permitted to lock out a processing element node from being accessed by the non-flow controlled virtual maintenance channel.

In a preferred embodiment of the multiprocessor computer system according to the present invention, the path of a route within the non-flow controlled virtual maintenance channel is defined with delta values. To permit more flexibility for selecting paths within the non-flow controlled maintenance channel, the delta values are preferably defined to have a primary and secondary delta value in each dimension. A response packet typically follows the same path taken by its corresponding request packet in the non-flow controlled virtual maintenance channel.

The multiprocessor computer system preferably includes read/write registers at each processing element node, which do not affect system operation. In this way, the read/write registers can be written to and read from through the non-flow controlled virtual maintenance channel to verify that certain routes are valid.

In one embodiment of the multiprocessor computer system, the at least one flow controlled virtual channel includes two acyclic non-adaptive virtual channels and an adaptive virtual channel. The two acyclic non-adaptive virtual channels include first and second type virtual channel buffers assigned to each physical communication link to store the normal traffic packets along deterministic virtual paths between the plurality of processing element nodes based on the routing information. The adaptive virtual channel includes a third type of virtual channel buffer assigned to each physical communication link to store the normal traffic packets along non-deterministic virtual paths between the plurality of processing element nodes based on the routing information.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

MPP System

Figure 1:
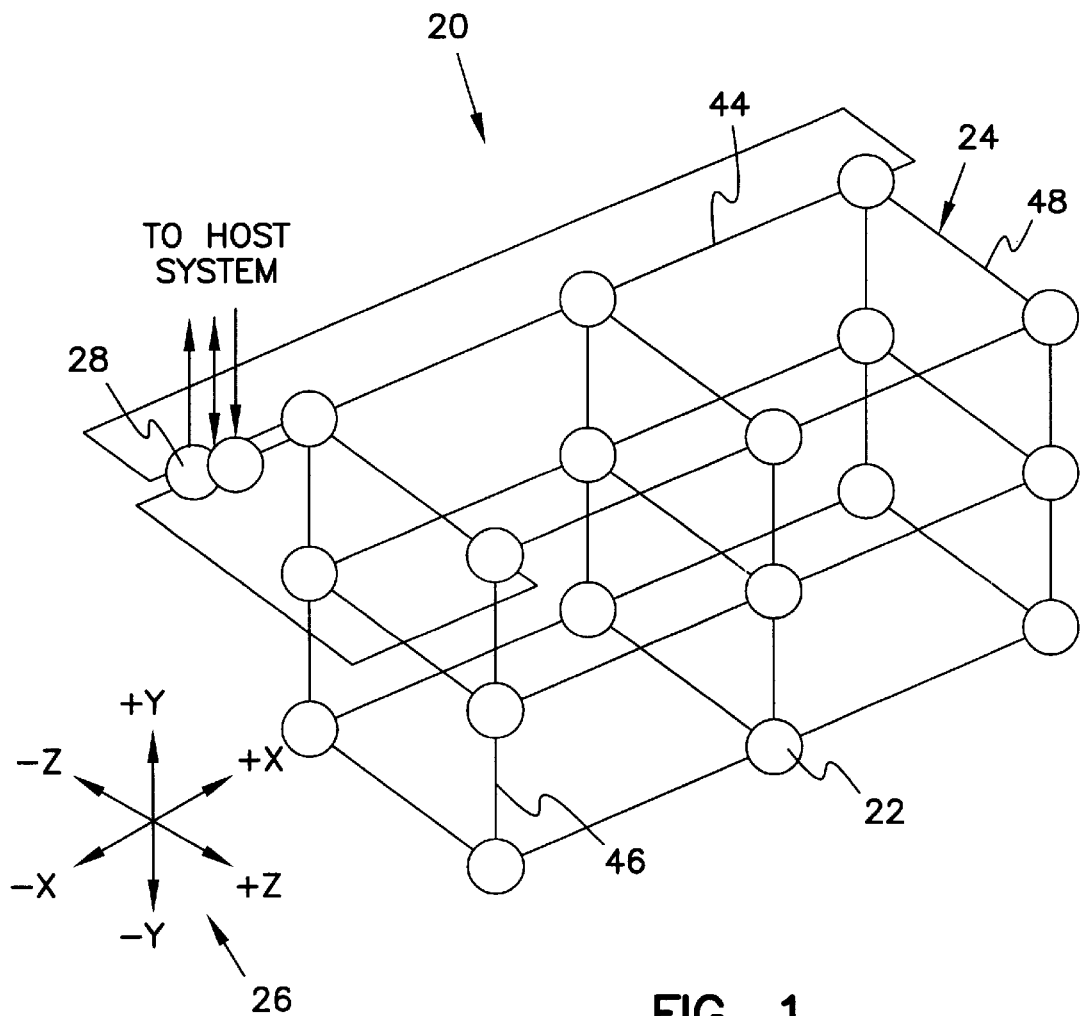
FIG. 1 is a diagram of a massively parallel processing (MPP) system.

FIG. 1 illustrates a simplified model of the components of a massively parallel processing (MPP) system generally indicated at 20. MPP system 20 typically comprises hundreds or thousands of processing element nodes, such as processing element node 22. An interconnect network 24 provides communication paths among the processing element nodes in MPP system 20. In the model of system 20 illustrated in FIG. 1, interconnect network 24 forms a three-dimensional matrix of paths which connect the processing element nodes in the x, y, and z dimensions as indicated by arrows 26. Interconnect network 24 also connects the processing element nodes to an I/O gateway 28. I/O gateway 28 transfers system data and control information between a host system (not shown) or an I/O subsystem (not shown) and MPP system 20.

The host system runs software compilers for MPP system 20. All software programs written for MPP system 20 are compiled on the host system, but are run in MPP system 20. In a single-cabinet configuration, the host system resides in the same cabinet as MPP system 20. In a multiple-cabinet configuration, the host system resides in a separate cabinet that is cabled to MPP system 20.

Figure 2:
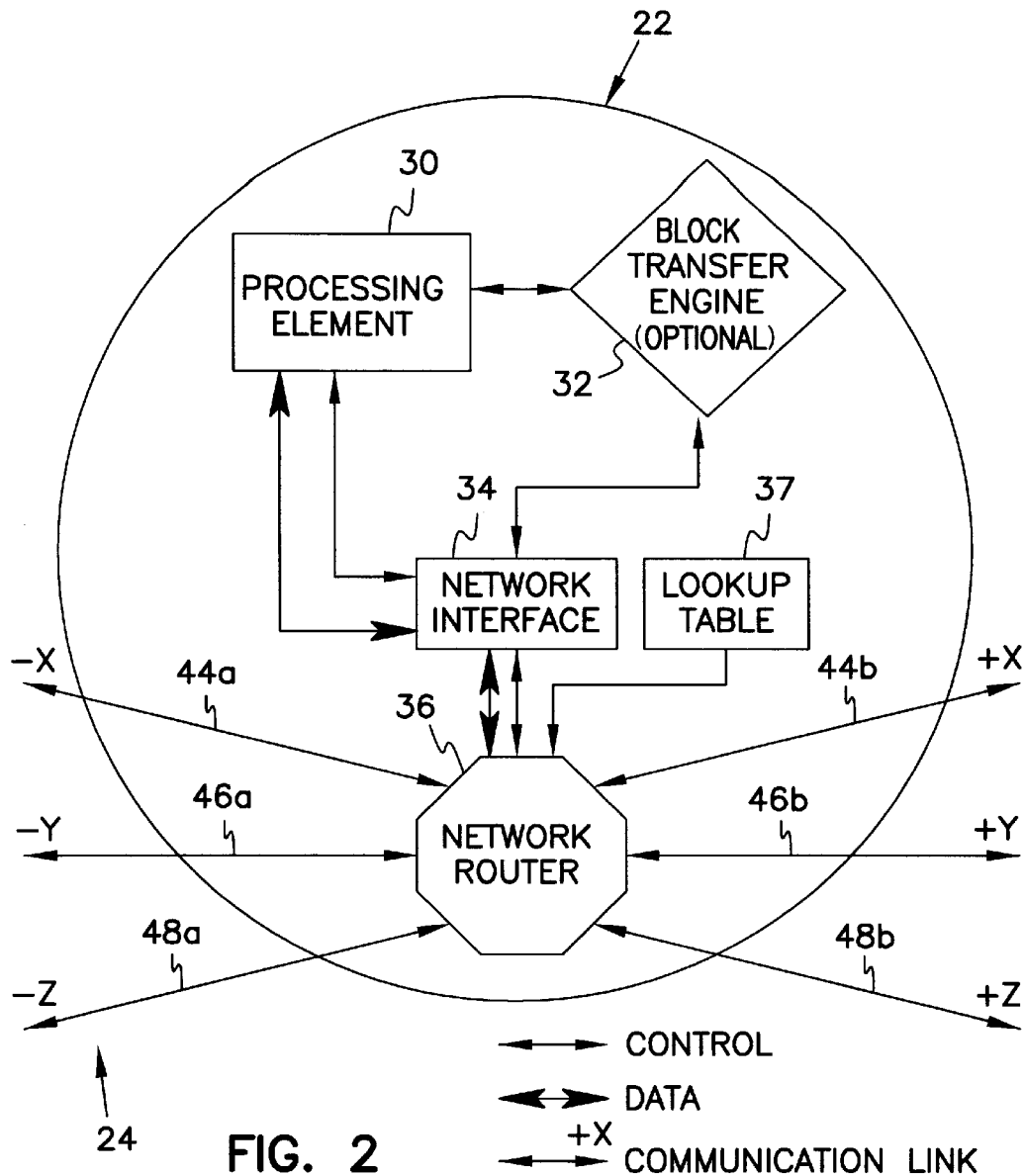
FIG. 2 is a diagram of a processing element node and interconnect network components for the MPP system of FIG. 1.

FIG. 2 provides a more detailed illustration of processing element node 22 and the connection of processing element 22 to interconnect network 24. Each processing element node, such as processing element node 22, typically comprises a processing element 30, an optional block transfer engine 32, and a network interface 34. Processing element node 22 may comprise more than one processing element 30.

Figure 3:
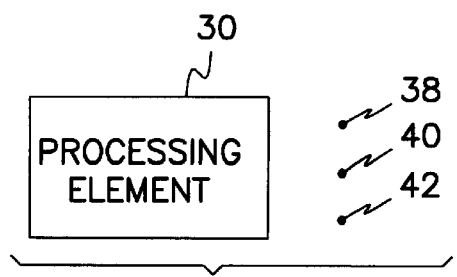
FIG. 3 is a diagram of processing element components for the MPP system of FIG. 1.

As illustrated in FIG. 3, each processing element 30 comprises a microprocessor 38, a local memory 40, and support circuitry 42.

MPP system 20 includes a physically distributed memory, because each processing element contains local memory. Nevertheless, the MPP system memory is also logically shared. System memory is logically shared because the microprocessor in one processing element can access a memory of another processing element without involving the microprocessor in that processing element.

Local memory 40 preferably comprises a dynamic random access memory (DRAM) to store system data. A low-latency, high-bandwidth data path connects the microprocessor to local memory in processing element 30.

Support circuitry 42 extends the control and addressing functions of microprocessor 38. Support circuitry 42 performs data transfers to or from local memory 40.

Referring back to FIG. 2, optional block transfer engine (BLT) 32 is an asynchronous direct memory access controller that redistributes system data. BLT 32 redistributes system data between local memory in processing element 30 and the local memory in remote processing elements. BLT 32 is capable of redistributing data without interrupting processing element 30 or the remote processing elements. An alternative preferred embodiment of MPP system 20 does not include optional BLT 32, and instead relies on system software to control movement of blocks of data between the local memories of the processing elements.

Network interface 34 formats information to be sent over interconnect network 24 to another processing element node or I/O gateway 28. Network interface 34 also receives incoming information from other processing element nodes or I/O gateway 28 and directs the information to processing element 30.

Interconnect network 24 connects all of the processing element nodes together for purposes of data communication, barrier/eureka synchronization, system configuration, and maintenance. Network performance monitoring features are also built into interconnect network 24. Data routing is broken into three virtual components, which include an acyclic virtual network, an adaptive virtual network, and a non-blocking virtual maintenance network. Normal data traffic is transmitted on the acyclic and adaptive networks. As described in detail below, the acyclic network is responsible for avoiding deadlock and the adaptive network permits adaptive routing. Potential cycles in the acyclic network are broken through a combination of direction order routing and virtual channels, as discussed below. Maintenance traffic travels on the virtual maintenance network.

Interconnect network 24 comprises network routers such as network router 36 illustrated in FIG. 2. At boot time, all routers must be configured and initialized via a growth process that starts at a processing element node connected to a maintenance work station or other boot device. In addition, interconnect network 24 comprises physical communication links in each direction of each dimension. X dimension communication links 44 connect nodes in the x dimension. Y dimension communication links 46 connect nodes in the y dimension. Z dimension communication links 48 connect processing element nodes in the z dimension. Representative communication links in each dimension are illustrated in FIG. 1. FIG. 2 also illustrates a communication link 44a in the −X direction, a communication link 44b in the +X direction, a communication link 46a in the −Y direction, a communication link 46b in the +Y direction, a communication link 48a in the −Z direction, and a communication link 48b in the +Z direction.

Communication links 44, 46, and 48 transfer data and control information between the network routers in the interconnect network. A communication link typically comprises two unidirectional channels. Each channel in the link preferably contains data, physical unit (phit) type, virtual channel select, and virtual channel acknowledge signals.

Data signals preferably carry either request information or response information. Request information contains information that requests a node to perform an activity. For example, a source node may send a request to a designation node to read data from memory in the destination node. This request is sent over one channel in the communication link. Responses contain information that is a result of an activity. For example, after receiving a request for read data, a destination node sends the response back to the source node. The response contains the read data. Requests and responses are preferably logically separated to avoid deadlock. The logical separation of requests and responses is described below.

Figure 4:
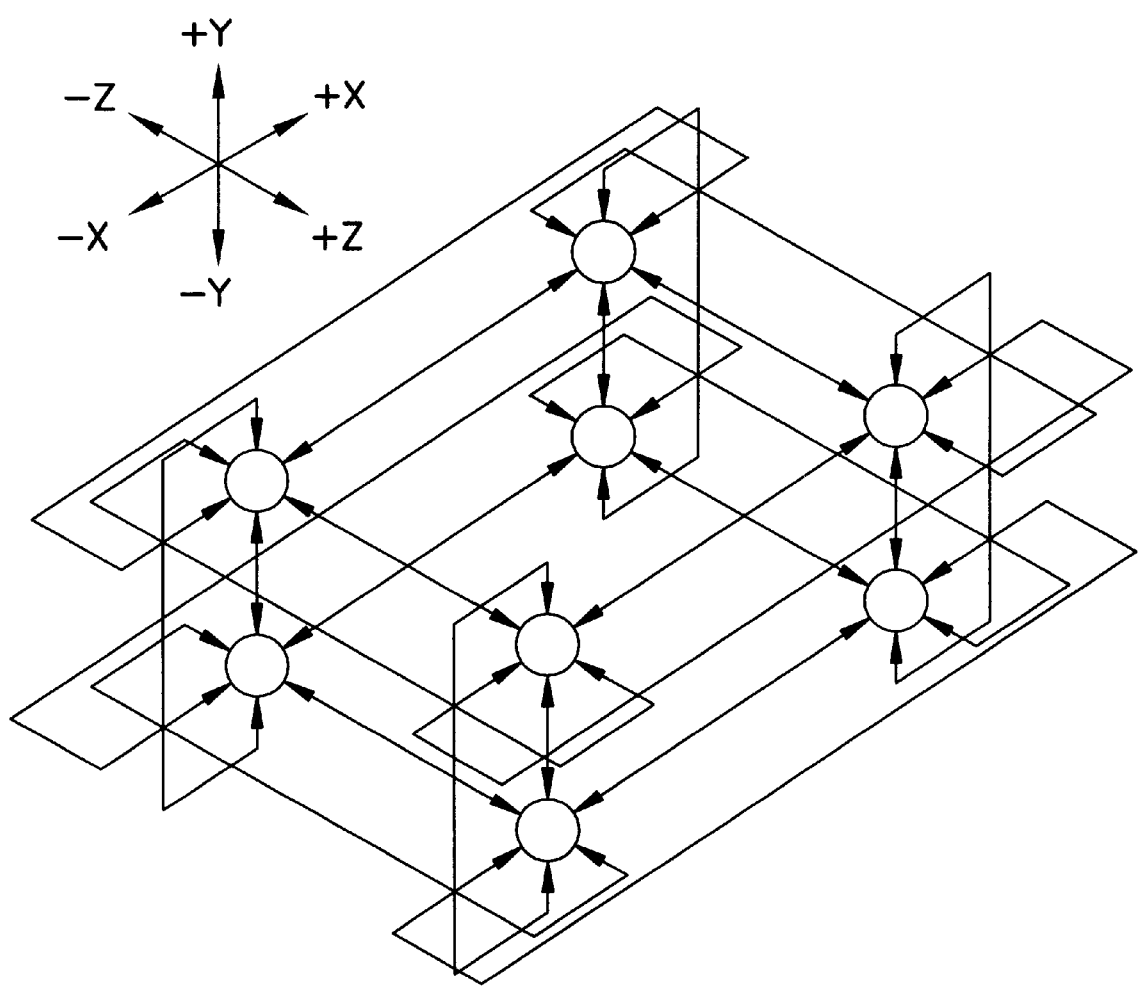
FIG. 4 is a diagram of a MPP system having a three-dimensional torus network topology.

Interconnect network 24 preferably connects the processing element nodes in a bi-directional torus. FIG. 4 illustrates a preferred embodiment of MPP system 20, having a three-dimensional torus network in the x, y, and z dimensions. Each processing element node in the 3-D torus has communication links in both the + and − directions of the x, y, and z dimensions. Several of the other diagrams in the specification show three-dimensional network connections. For clarity, in these other diagrams, the communication links that complete the torus in each dimension are not shown.

In a torus topology, a ring is formed in each dimension where information can transfer from one node, through all of the nodes in the same dimension and back to the original node. Torus networks offer several advantages for network communication, such as increasing the speed of transferring information. Another advantage of the torus network is the ability to avoid bad communication links by sending information the long way around the network.

Information is transferred between the processing element nodes on the communication links in the form of a packet. Each packet preferably comprises a header. The header includes routing information that steers the packet through the network, destination information that indicates which processing element should receive the packet, and control information that instructs the processing element that receives the packet to perform an operation. The header may also contain source information that indicates which processing element created the packet and may contain memory address information. A packet optionally comprises a body. The body of a packet typically includes data to be transferred between processing element nodes or system data from or to the host system.

The network routers, such as network router 36, at each processing element node transfer packets of normal traffic through the communication links in interconnect network 24 based on the routing information contained in each header of each packet. The header and the body have variable links and transfer over the communication links one phit at a time. MPP system 20 uses wormhole routing as defined in the Background section in which routing information is contained in the header flit, and the remaining flits follow behind it in a train-like fashion to control the flow of normal traffic. Flow control of normal traffic between nodes is accomplished on a flit-by-flit basis, rather than a packet-by-packet basis, so it is possible for a packet to be partially transmitted across a link and blocked due to a shortage of buffer space in a receiving processing element node. As mentioned above, the preferred embodiment of the present invention is a bi-directional 3-D torus network, which further complicates deadlock situations.

Adaptive Routing Mechanism for Normal Traffic

A preferred adaptive routing mechanism for routing packets of normal data traffic through interconnect network 24 on the acyclic and adaptive virtual networks utilizing virtual channels multiplexed across common physical communication links, but otherwise operating independently is described in detail in the co-pending and commonly assigned U.S. Pat. No. 5,701,416, issued on Dec. 23, 1997, entitled "ADAPTIVE ROUTING MECHANISM FOR TORUS INTERCONNECTION NETWORK," and which is incorporated herein by reference. MPP system 20 preferably utilizes an adaptive routing mechanism for normal traffic using a first subset of virtual channels C1. The C1 virtual channels implement non-adaptive, deadlock-free routing among all nodes. The C1 virtual channels form the acyclic virtual network component of interconnect 24. The second type of virtual channel is an NC1 virtual channel. The NC1 channel implements minimal fully adaptive routing. The NC1 virtual channel forms the adaptive virtual network component of interconnect 24. The NC1 virtual channel may have cycles in its channel dependency graph, since packets route freely in the NC1 channels. If at any time a decision would be made that would deadlock in the NC1 virtual channel, then the packet must be able to jump to a C1 virtual channel. Thus, packets in the NC1 channel must always be able to route into a C1 channel.

Figure 5:
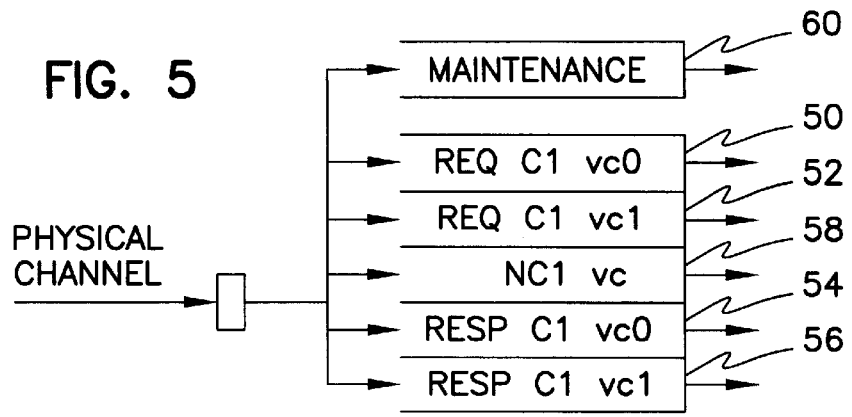
FIG. 5 is a diagram illustrating virtual channels utilized for normal traffic and maintenance traffic for each network physical communication link or channel of a preferred embodiment of MPP system of FIG. 1.

FIG. 5 illustrates the virtual channels utilized for each network physical channel or physical communication link. Two virtual channels 50 and 52 are used for the C1 virtual request network. Virtual channel 50 is a vc0 type virtual channel, and virtual channel 52 is a vc1 type virtual channel. Similarly, the response C1 virtual network comprises two virtual channels 54 and 56. Virtual channel 54 is a vc0 type virtual channel and virtual channel 56 is a vc1 type virtual channel. The third virtual channel, vc, is the adaptive NC1 virtual channel 58, which provides adaptive routing in both the request and response networks. Although the preferred embodiment illustrated in FIG. 5 uses one NC1 channel, a separate NC1 channel may be used for both the request and response virtual networks. In addition to the virtual channels used for normal traffic, a virtual maintenance channel 60 is used for carrying maintenance traffic. Virtual maintenance channel 60 forms the non-blocking virtual maintenance network portion of interconnect network 24, which is described in detail below.

Figure 6:
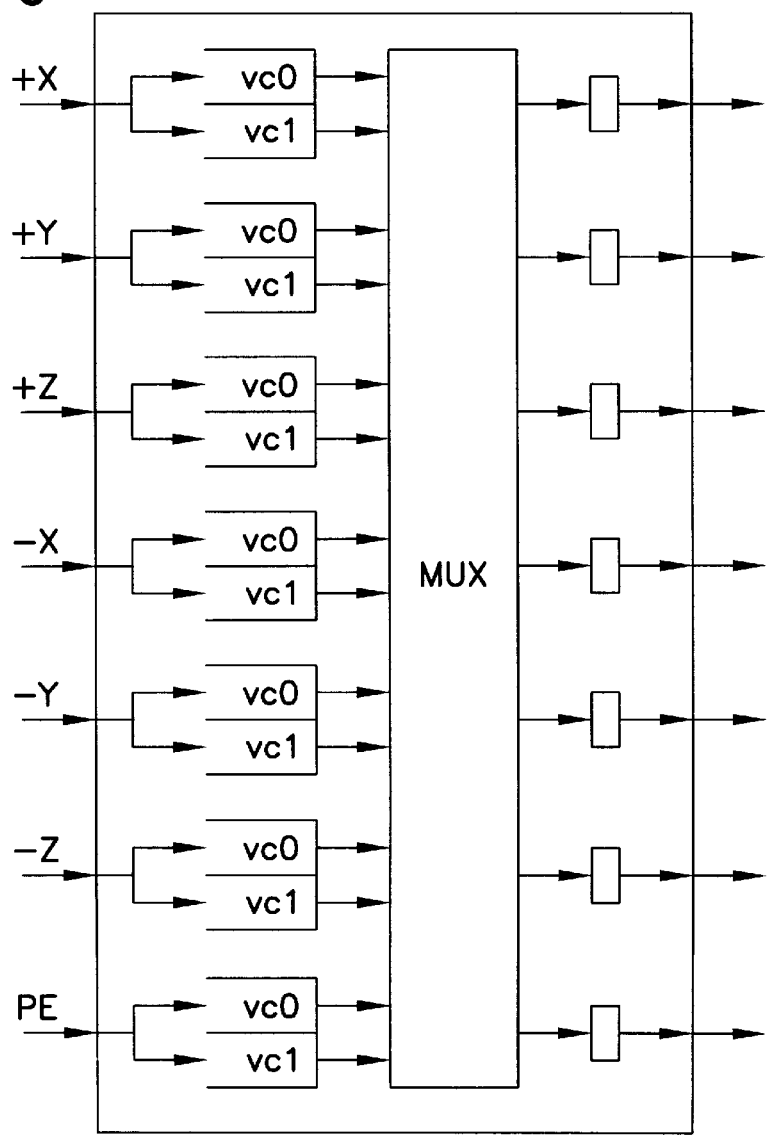
FIG. 6 is a block diagram of a switching mechanism in a 3-D network using virtual channels.

Referring to FIG. 6, each node has an input and output for each of the six directions (+X, −X, +Y, −Y, +Z, −Z) as well as the local processing element (PE). The block diagram of FIG. 6 illustrates switching in the 3D request or response C1 network using virtual channels. Buffers for the virtual channels reside at the processing node inputs at the receiving end of the physical communication link. The sending node on each physical communication link keeps track of the available buffer space for each virtual channel in the receiving processing element node, using flow control information sent on the opposite-direction link.

At any time, a packet in a C1 virtual channel may route to any NC1 virtual channel at the packets's current node that moves the packet closer to its destination (minimally). A packet in an NC1 virtual channel may also route minimally to any NC1 channel at its current node. A packet in an NC1 channel may route to a C1 channel at any time. Upon re-entering the C1 virtual channel network, the packet routes on a physical and virtual channel according to the deterministic C1 routing algorithm, using the current node's virtual channel look-up table. Within either the request or the response C1 virtual channel networks, choosing to begin a route of a packet on the vc0 virtual channel or the vc1 virtual channel and deciding when to change virtual channels during a route of a packet affects both correctness and performance. The primary consideration is correctness (i.e. the allocation of virtual channels between vc0 and vc1 must prevent deadlock).

The following three steps are performed to prevent deadlock in the C1 virtual channels. First, request and response packets are routed on separate sets of virtual channels. This breaks any cycles between request and response traffic. Secondly, direction-order routing is preferably used to break any cycles involving multiple directions. In other words, the packets are routed through a predetermined direction priority, such as (+X, +Y, +Z, −X, −Y, −Z). For example, using the direction order specified above, a route for a +X, −Y, +Z destination would route first +X, then +Z, then −Y. Direction order routing is described in detail in co-pending patent application Ser. No. 07/983,979, filed Nov. 30, 1992, and entitled "DIRECTION ORDER ROUTING IN MULTIPROCESSING SYSTEM" and assigned to Cray Research, Inc., the assignee of the present invention, which is incorporated herein by reference.

The third step to prevent deadlock is the use two virtual channels (vc0 and vc1) to break cycles within each ring. This third step can be achieved in a variety of ways to optimize performance. Preferred methods of virtual channel allocation are described in detail in the co-pending and commonly assigned U.S. Pat. No. 5,659,796, issued on Aug. 19, 1997. entitled "OPTIMIZED VIRTUAL CHANNEL ALLOCATION IN PARALLEL PROCESSING SYSTEMS," and which is incorporated herein by reference. The vc0 or vc1 virtual channel is selected when a packet begins routing on a ring via routing information stored in a virtual channel look-up table 37 (shown in FIG. 2) based upon the packet's destination on that ring (the coordinate of the destination node in the corresponding dimension). Each processing element node has a small, system-configurable virtual channel look-up table 37 for each of its six directions. Routing in the C1 network is strictly deterministic.

The preferred routing mechanism for routing between C1 and NC1 as described in detail in the above cited and incorporated co-pending and commonly assigned U.S. patent application Ser. No. 08/421,566 entitled "ADAPTIVE ROUTING MECHANISM FOR TORUS INTERCONNECTION NETWORK," places the following restriction on NC1 channels: no packet may enter an NC1 channel unless the buffer for that channel has room to hold the entire packet. This restriction prevents deadlock from occurring within the NC1 channels because no packet can block in an NC1 channel with its tail blocking the head of a different channel buffer. Since a packet whose head is at the front of an NC1 channel buffer can always route into a C1 virtual channel, deadlock of the NC1 virtual network is impossible. In addition, this restriction removes indirect dependencies between C1 channels. Any packet that enters NC1 can be fully accepted by the first NC1 channel buffer because no packet may enter an NC1 virtual channel unless the buffer for that channel has room to hold the entire packet. Therefore, a packet cannot route from C1 into NC1 and back, and then block with the packet's tail consuming buffer space in the first C1 channel buffer. As a result, the preferred routing mechanism can be used to route packets through any interconnect network topology for which a deadlock-free deterministic routing algorithm on the C1 channels can be constructed. Preferably, as described above, the deadlock-free deterministic routing algorithm is the direction order routing scheme having two virtual channels assigned to the request network and two virtual channels assigned to the response network.

MPP system 20 preferably uses absolute addressing in all three dimensions, from source to destination node for normal traffic. Alternatively, MPP system 20 uses differential addressing for normal traffic wherein the destination address is calculated at the source node and is decremented/incremented to zero when it reaches the destination node.

Virtual Maintenance Network

As mentioned above, in addition to the acyclic and adaptive virtual networks used for carrying normal traffic, MPP system 20 utilizes a non-blocking virtual maintenance network comprising the non-flow controlled virtual maintenance channel 60 illustrated in FIG. 5 for carrying maintenance traffic. In the embodiment illustrated in FIG. 5, the five virtual channels for carrying normal traffic and virtual maintenance channel 60 are assigned to each network physical communication link. In this way, virtual maintenance channel 60 shares the same physical communication links (i.e., wires) as the virtual channels for carrying normal traffic.

Virtual maintenance channel 60 is utilized for system initialization operations such as initializing certain network registers. Virtual maintenance channel 60 is utilized to configure MPP system 20. MPP system 20 diagnostics are performed through virtual maintenance channel 60, such as troubleshooting an unhealthy network. Moreover, monitoring functions such as hardware monitoring, error monitoring, and performance monitoring are performed on virtual maintenance channel 60.

The buffers of the virtual channels carrying normal data traffic preferably reside in RAM cells. By contrast, the buffers of virtual maintenance channel 60 are typically implemented in flip-flop registers, which are completely separate from the RAM cells used for the above described adaptive routing of the normal traffic. In this way, maintenance traffic does not destroy normal data traffic.

System software utilizes a special routing mechanism for routing maintenance traffic through the virtual maintenance network formed by virtual maintenance channel 60. First, virtual maintenance channel 60 is assigned a higher priority than all of the virtual channels carrying the normal traffic. As a result, maintenance operations are always given access to the physical communication links when a conflict exists between a maintenance data packet and a normal data packet. Secondly, the special routing is non-flow controlled, and therefore, no checks are performed for potential buffering problems prior to sending a packet of maintenance traffic. If two maintenance traffic data packets collide, one of the maintenance data packets will overwrite the other maintenance data packet. Thus, in the non-flow controlled virtual maintenance channel 60, software must ensure that conflicting traffic not be sent. Software control of potential conflicts between maintenance packets does not, however, present a serious problem, because with maintenance operations there are generally no significant performance issues to be resolved.

The advantage to non-flow controlled traffic is that deadlock cannot occur, because when the maintenance traffic is not flow controlled there are no changes of dependencies since traffic is just sent to the destination node without checking for potential buffering problems. In other words, the special routing mechanism transfers maintenance packets through a non-blocking network. A non-blocking network is free of potential deadlock conditions, but if two packets of maintenance information access the same network router port at the same time, one packet will overwrite the other.

The special routing used in virtual maintenance channel 60 preferably utilizes delta values to route packets of information through the interconnect network. Delta values enable system software to send information to physical processing element nodes prior to assigning physical node numbers to the processing element nodes.

In one embodiment of the virtual maintenance network, special routing is performed by using a special get (SGET) command, which transfers data from a special routing register to a processor register. The special routing registers in MPP system 20 include routing look-up tables, reset switches, register support circuitry, special read/write registers, system state/control registers, and the like. In one embodiment of the present invention, the processor registers are contained in the microprocessors themselves, such as microprocessor 38 indicated in FIG. 3. In another embodiment, the processor registers are implemented external to the microprocessor in static RAM (SRAM) cells in the processing element support circuitry, such as support circuitry 42 indicated in FIG. 3. In addition to the SGET command, the special routing utilizes a special put (SPUT) command used for transferring data from a processor register to one of the special routing registers.

In a preferred embodiment of the virtual maintenance network according to the present invention, six delta values define a path of a special route and each delta value is positive or negative. The six delta values are as follows:

1. Primary $\Delta X$ value
2. Primary $\Delta Y$ value
3. Primary $\Delta Z$ value
4. Secondary $\Delta X$ value
5. Secondary $\Delta Y$ value
6. Secondary $\Delta Z$ value In interconnect network 24, each transfer of information over a communication link is called a hop. When following a special routing path in the virtual maintenance network, maintenance information makes the same number of hops as a delta value. For example, if the primary $\Delta X$ value is set to +3, the maintenance information completes three hops in the positive X direction. Additionally, when following a special routing path, maintenance information travels through the dimensions in the order shown in the above list.

Figure 7:
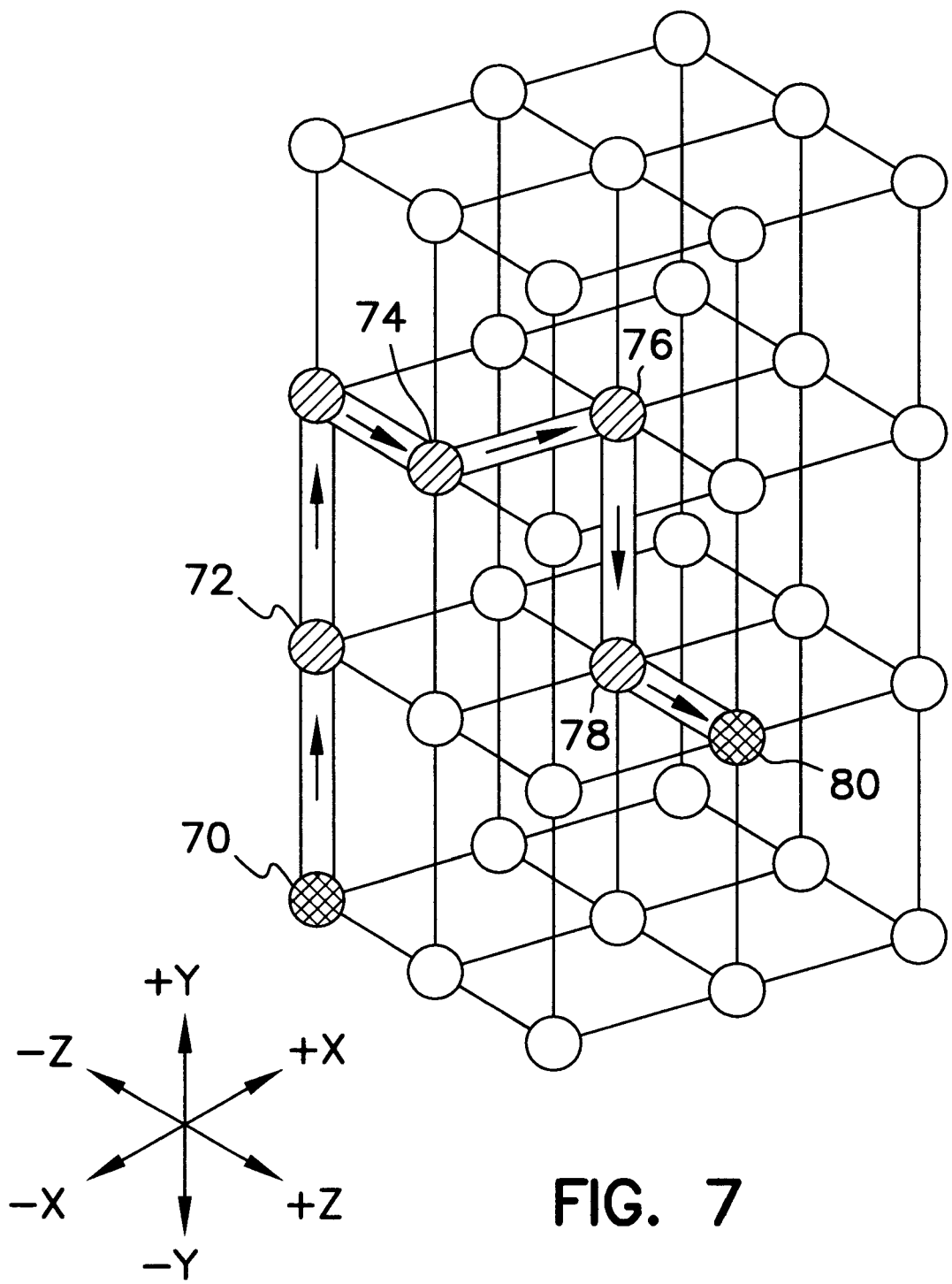
FIG. 7 is a diagram of a MPP system illustrating an example special route on a virtual maintenance network.

FIG. 7 illustrates one of several possible special routing paths through interconnect network 24 from a source node to a destination node in a 36-node MPP system. For clarity, FIG. 7 does not show all the communication links in the MPP system. For this illustrated example, the $\Delta$ values are set as follows:

Primary $\Delta X$ value=0
Primary $\Delta Y$ value=+2
Primary $\Delta Z$ value=+1
Secondary $\Delta X$ value=+1
Secondary $\Delta Y$ value=−1
Secondary $\Delta Z$ value=+1

The special routing path illustrated in FIG. 7 is from a source node 70 to a destination node 80. First, since the primary $\Delta X$ value is 0, the packet does not travel initially in the X dimension. With a primary $\Delta Y$ value equal to +2, the maintenance packet travels +2 in the Y dimension to a node 72. With a primary $\Delta Z$ value equal to +1, the maintenance packet then travels +1 in the Z dimension to a node 74. With a secondary $\Delta X$ value equal to +1, the maintenance packet then travels +1 in the X dimension to a node 76. With a secondary $\Delta Y$ value equal to −1, the maintenance packet then travels −1 in the Y dimension to a node 78. Finally, with the secondary $\Delta Z$ value equal to +1, the maintenance packet then travels +1 in the Z dimension to the destination node 80.

The secondary $\Delta$ values in each dimension provide more potential paths to system software. In this way, system software is given extreme flexibility in selecting a given special route path.

In the preferred embodiment of the virtual maintenance network, requests and responses are on the same paths. As a result, once a given request path is identified and then verified, a corresponding response path is also identified and verified. As mentioned above, the special routing registers preferably include read/write registers which are not used to indicate system maintenance, system state, or system control conditions. These read/write registers are used to verify that a selected connection path between two nodes in the MPP system exists. In other words, the state of a given read/write register does not affect MPP system 20, but the given read/write register can be written and subsequently read to verify that a special routing path has been completed.

The virtual maintenance network is preferably accessible through system software from any processing element node in the system. Nevertheless, preferred special features are included to permit locking out of a given processing element node if that processing element node is misbehaving.

The following is an example of special routing where a source node writes a value into a network router SGET return register of a destination node. The destination node utilizes the values stored in the SGET return register as the delta values for an SGET response packet. First, the processing element in the source node stores values for the SGET return register of the destination node in a source processor register. Second, the processing element in the source node issues an SPUT command. While issuing the SPUT command, the source node processing element generates delta values for routing an SPUT command packet, an address for the SGET return register, and a source processor register number. Third, the network router in the source node creates the SPUT command packet and sends the SPUT packet to the destination node over the non-blocking virtual maintenance network. Fourth, the network router in the destination node receives the SPUT packet and stores the delta values in the SGET return register.

Another example of special routing is where a source node reads a value from a network router software register of a destination node. System software writes values to the software register while determining the node shape of the MPP system. System software can write any value to the software register without affecting system hardware.

First, the processing element in the source node issues an SGET command. While issuing the SGET command, the processing element in the source node generates the delta values for routing an SGET command packet to the destination node, an address for the software register, and a destination processor register number in the source node. Second, the network router in the source node creates an SGET request packet and sends the SGET request packet to the destination node over the non-blocking virtual maintenance network. Third, the network router in the destination node retrieves the value from the software register and uses the value stored in the SGET return register to create a SGET response packet. Fourth, the network router and the destination node sends the SGET response packet to the source node over the non-blocking virtual maintenance network. Fifth, the source node stores the value from the software register into a destination processor register in the source node.

The above described virtual maintenance network according to the present invention avoids deadlock due to the non-blocking nature of the virtual maintenance network. The virtual maintenance network is non-blocking because no back pressure is exerted. Consequently, conflicts on the virtual maintenance network result in lost packets. However, these conflicts involve maintenance packets that are both on the virtual maintenance network. As described above, the virtual maintenance network utilizes flip-flop registers for buffering the maintenance packets that are separated from the RAMs for buffering the normal traffic packets. Thus, system software need only ensure that conflicting traffic is not sent over the maintenance virtual network. Moreover, normal operations can be performed on the normal traffic flow controlled virtual networks simultaneously with maintenance operations being performed on the virtual maintenance network, even though the virtual maintenance network utilizes the same physical communication links as the flow controlled virtual networks.

As mentioned above, the primary and secondary delta values provide numerous potential paths for routing a maintenance packet from a given source node to a given destination node. Typically, system software selects an initial path for routing a maintenance packet through the non-flow controlled virtual maintenance channel 60 from a source node to a destination node. If after a selected amount of time, the packet does not successfully route on the initially selected path, and alternative path is selected by the system software for routing the maintenance packet through the non-flow controlled virtual maintenance channel 60 from the source node to the destination node. This retry mechanism can be utilized to route maintenance packets around undiscovered broken physical communication links.

Conclusion

The MPP system 20 according to the present invention includes a non-blocking, non-flow controlled virtual maintenance network to perform system initialization, diagnostics, and other maintenance functions. This special non-blocking virtual maintenance network shares the same physical communication links as the flow controlled virtual channels carrying normal traffic. The non-blocking virtual maintenance channel is assigned a higher priority than the flow controlled virtual channels. In this way, special physical communication links (i.e., wires) dedicated solely for maintenance functions are eliminated. Because separate buffers are used for the virtual maintenance channels, maintenance operations can be performed simultaneously with normal traffic operations. In addition, in a preferred embodiment of the present invention primary and secondary delta values are used to designate special routing paths in the virtual maintenance network to provide extreme flexibility in selecting paths through the virtual maintenance network even when the MPP system is not yet configured. In addition, provisions are provided for allowing a response maintenance packet to follow the same route as its corresponding request maintenance packet.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A multiprocessor computer system comprising:

a plurality of processing element nodes;

physical communication links interconnecting the plurality of processing element nodes in an n-dimensional topology;

at least one flow controlled virtual channel having virtual channel buffers assigned to each physical communication link to store packets containing normal traffic information to be transferred between the plurality of processing element nodes; and a non-flow controlled virtual maintenance channel having maintenance channel buffers assigned to each physical communication link to store packets of maintenance information to be transferred between the plurality of processing element nodes, wherein the maintenance channel is assigned a higher priority for accessing the physical communication links than the at least one flow controlled virtual channel.

2. The multiprocessor computer system of claim 1 wherein the non-flow controlled virtual maintenance channel is accessible through system software running on the multiprocessor computer system from any of the processing element nodes.

3. The multiprocessor computer system of claim 1 further comprising means for locking out a processing element node from being accessed by the non-flow controlled virtual maintenance channel.

4. The multiprocessor computer system of claim 1 further comprising means for permitting a response packet to follow the same path taken by its corresponding request packet in the non-flow controlled virtual maintenance channel.

5. The multiprocessor computer system of claim 1 wherein the path of a route within the non-flow controlled virtual maintenance channel is defined with delta values.

6. The multiprocessor computer system of claim 5 wherein the delta values are defined to have a primary and a secondary delta value in each dimension.

7. The multiprocessor computer system of claim 1 further comprising read/write registers at each processing element node which can be written to and read from through the non-flow controlled virtual maintenance channel to verify that certain routes are valid.

8. The multiprocessor computer system of claim 1 wherein the at least one flow controlled virtual channel comprises:

two acyclic non-adaptive virtual channels having first and second type virtual channel buffers assigned to each physical communication link to store the normal traffic packets along deterministic virtual paths between the plurality of processing element nodes based on routing information; and an adaptive virtual channel having a third type of virtual channel buffer assigned to each physical communication link to store the normal traffic packets along non-deterministic virtual paths between the plurality of processing element nodes based on the routing information.

9. A method of maintaining a multiprocessor computer system including a plurality of processing element nodes interconnected with physical communication links in an n-dimensional topology, the method comprising the steps of:

defining at least one flow controlled virtual channel having normal virtual channel buffers to store packets containing normal traffic information to be transferred between the plurality of processing element nodes;

assigning the at least one flow controlled virtual channel to each physical communication link;

defining a non-flow controlled virtual maintenance channel having maintenance channel buffers to store packets of maintenance information to be transferred between the plurality of processing element nodes; and assigning the non-flow controlled virtual maintenance channel to each physical communication link, wherein the maintenance channel is assigned a higher priority for accessing the physical communication links than the at least one flow controlled virtual channel.

10. The method of claim 9 further comprising the step of accessing the non-flow controlled virtual maintenance channel with system software running on the multiprocessor computer system.

11. The method of claim 10 wherein the accessing step is capable of being performed from any of the processing element nodes.

12. The method of claim 9 further comprising the step of locking out a processing element node from being accessed by the non-flow controlled virtual maintenance channel.

13. The method of claim 9 wherein a response packet is allowed to follow the same path taken by its corresponding request packet in the non-flow controlled virtual maintenance channel.

14. The method of claim 9 further comprising the step of defining the path of a route within the non-flow controlled virtual maintenance channel with delta values.

15. The method of claim 14 further comprising the step of defining the delta values to include a primary and a secondary delta value in each dimension.

16. The method of claim 9 further comprising the step of verifying that a selected route is valid by writing to and reading from a selected read/write register at a processing element node through the non-flow controlled virtual maintenance channel.

17. The method of claim 9 wherein the step of assigning the at least one flow controlled virtual channel to each physical communication link comprises the step of assigning a first type virtual channel buffer, a second type virtual channel buffer, and a third type virtual channel buffer to each physical communication link, and wherein the step of defining at least one flow controlled virtual channel comprises the steps of:

defining two acyclic non-adaptive virtual channels capable of utilizing the first and the second type virtual channel buffers to store the normal traffic packets along a deterministic virtual path from a source node to a destination node based on routing information; and defining an adaptive virtual channel capable of utilizing the third type of virtual channel buffers to store the normal traffic packets along a plurality of non-deterministic virtual paths from the source node to the destination node based on the routing information.

18. The method of claim 15 further comprising the steps of:

selecting an initial path for routing a maintenance packet through the non-flow controlled virtual maintenance channel from a source node to a destination node; and selecting an alternative path for routing the maintenance packet through the non-flow controlled virtual maintenance channel from the source node to the destination node if the packet does not successfully route on the selected initial path after a selected amount of time.

* * * * *

UNITED STATES PATENT AND TRADEMARK OFFICE
CERTIFICATE OF CORRECTION

PATENT NO. : 6,055,618
DATED : April 25, 2000
INVENTOR(S) : Thorson

It is certified that error appears in the above-identified patent and that said Letters Patent is hereby corrected as shown below:

In the Title, after "HAVING A", insert --HIGH PRIORITY--.
In column 8, line 8, delete "patent application Serial No. 07/983,979, filed Nov. 30, 1992 and insert --U.S. Patent No. 5,533,198 issued on July 2, 1996--, therefore.

Signed and Sealed this

Tenth Day of April, 2001

Attest:

NICHOLAS P. GODICI

Attesting Officer     Acting Director of the United States Patent and Trademark Office